United States Patent Office 3,066,092
Patented Nov. 27, 1962

3,066,092
PROCESS FOR PREPARING SILICA-ALUMINA CATALYSTS AND HYDROCARBON CRACKING PROCESS USING SAID CATALYSTS
Milton E. Winyall, Baltimore, Md., assignor to W. R. Grace & Co., New York, N.Y., a corporation of Connecticut
No Drawing. Filed Apr. 16, 1959, Ser. No. 806,745
13 Claims. (Cl. 208—120)

This invention relates to silica-alumina catalysts. More particularly it relates to a process for preparing such catalysts having high alumina content. In another aspect it relates to a hydrocarbon cracking process using such catalysts.

This application is a continuation-in-part of copending application Serial No. 531,593, filed August 30, 1955, now U.S. Patent No. 2,886,512.

In the catalytic cracking of hydrocarbons, the oil stock is vaporized by heating to temperatures of about 800° F. to 1000° F. at atmospheric or greater pressures. The hydrocarbon vapors are intimately contacted with a silica-alumina catalyst where the high-boiling constituents are converted into gasoline. Concomitantly with the cracking operation, several complex side reactions take place, such as polymerization, alkylation, and the like. As a result of these reactions, a carbonaceous deposit (generally referred to as coke) is formed on the surface of the catalyst and this deposition seriously impairs its cracking efficiency. Catalytic activity is restored by burning the deposit from the catalyst surface in a stream of oxidizing gas and the catalyst is returned to the cracking process. Such regeneration is usually carried out at temperatures above those prevailing during cracking and because of the exothermic nature of the regeneration stage of the operation excessive heat is often developed.

It is known that short life and decrease in catalytic activity are related to the loss in mechanical strength of the catalyst. This loss is believed to be due to the lack of heat stability of the catalyst and occurs during the cracking process and in the regeneration stage. It is important, therefore, that the catalyst be relatively heat stable and this property is particularly desirable in fluid cracking systems which employ finely divided solid catalysts. In a fluid process a high degree of turbulence is necessary throughout the system to insure a uniform suspension of the catalyst in the reacting vapors. Consequently, the catalyst undergoes physical deterioration and appreciable quantities of fines are produced. These fines are difficult to retain within the system and represent a loss which cannot be tolerated if the catalyst is too unstable.

These shortcomings in hydrocarbon conversion processes motivated a search for a catalyst having greater mechanical strength and longer life under operating conditions. It is the belief that a more stable cracking catalyst could be obtained by increasing the alumina content in silica-alumina catalysts to about 20% to 40%, preferably about 25%. Efforts to achieve this end, however, have not produced a commercially acceptable high alumina catalyst. Failure to produce a satisfactory catalyst is generally attributed to the unsuccessful removal of alkali metal ions and other impurities. These impurities have a deleterious effect on such catalysts in that the activity drops rapidly over a series of cycles and the catalyst lacks stability. Attempts to reduce the impurities to a satisfactory level by using normal washing procedures have not been effective. By employing large quantities of washing medium, the impure constituents may be removed to a relatively acceptable level; however, this procedure results in excessive leaching of alumina and is very uneconomical, both in cost and time.

The present invention provides an improved process for preparing silica-alumina catalysts of high alumina content which obviate the aforementioned difficulties. Such catalysts are capable of retaining their mechanical strength during use and exhibit high cracking activity. In general, the process comprises forming a slurry of silica hydrogel containing dissolved alkali metal carbonate. To this slurry there is added with agitation a supplementary amount of basic reagent which together with the residual alkali metal carbonate present in the hydrogel slurry is sufficient to subsequently precipitate between about 15% and 40% by weight alumina in the final catalyst. An aqueous solution of an aluminum salt is thereafter commingled with the resulting slurry whereby alumina in the requisite amount is precipitated in and on the silica hydrogel and thereby form a silica-alumina composite. The composite is then conventionally finished off by washing and drying.

In accordance with the present invention, a silica hydrogel is prepared according to the teachings of copending application Serial No. 531,593. This involves neutralizing an aqueous alkali metal silicate solution by the addition thereto of carbon dioxide and results in the formation of a silica hydrogel containing dissolved alkali metal carbonate dispersed therethrough. While the process may be carried out with any of the alkali metal silicates, and any aluminum salt, sodium silicate and aluminum sulfate will be generally employed because of their favorable economic position. For the purpose of simplicity, the invention will be further described by using sodium silicate and aluminum sulfate, although it is to be understood that the present invention is not limited to the use of these two materials. While the aluminum salts of any of the strong mineral acids, such as aluminum sulfate, aluminum nitrate and aluminum chloride, for example, are preferred, it is also within the scope of the invention to employ salts of a weak acid, such as aluminum acetate, and readily hydrolyzable aluminum compounds, such as the lower alcoholates, as a source of alumina.

In preparing the silica hydrogel, the starting sodium silicate solution may be any commercially available water glass having a $SiO_2:Na_2O$ weight ratio of from about 1:1 to 3.40:1. The neutralization of the soda will usually be effected by the addition of carbon dioxide gas to the sodium silicate solution. This may be accomplished by bubbling the gas into a vessel containing the sodium silicate, or the reactants may be contacted in a mixing nozzle. Regardless of the method of mixing chosen, the reactants are desirably thoroughly agitated following contact and through formation of the silica hydrogel so that there results an aqueous slurry of hydrogel particles containing dissolved sodium carbonate.

Using a sodium silicate solution having a silica-to-soda weight ratio of about 3.25:1, the chemical reaction takes place according to the following Equation 1:

(1) 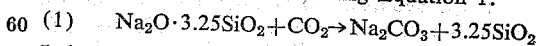$Na_2O \cdot 3.25SiO_2 + CO_2 \rightarrow Na_2CO_3 + 3.25SiO_2$

It is apparent from this equation, that for each mol of $Na_2O$ present in the starting sodium silicate solution, it is possible to precipitate one-third mol of alumina from an aluminum sulfate solution. The reaction is shown in Equation 2:

(2) 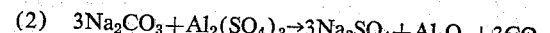$3Na_2CO_3 + Al_2(SO_4)_3 \rightarrow 3Na_2SO_4 + Al_2O_3 + 3CO_2$

Theoretically, this reaction will produce a silica-alumina catalyst containing about 14.5% by weight alumina.

In Equation 1, the neutralization will be substantially complete, that is to say, a stoichiometric amount of carbon dioxide based on the $Na_2O$ concentration of the starting sodium silicate solution will be employed. The resulting silica hydrogel exhibits an alkaline pH because of the presence of sodium carbonate. There is no apparent advantage in using a great excess of carbon dioxide, for example, 150–200% of that required for complete neutralization. Use of excess carbon dioxide will, of course, lower the pH of the resulting silica hydrogel through formation of sodium bicarbonate but formation of the bicarbonate will adversely affect spontaneous precipitation of alumina. Upon addition of aluminum sulfate to a silica hydrogel formed with a great excess of carbon dioxide there is formed a basic aluminum sulfate. Sulfate ions thus held are very difficult to remove from the silica-alumina composite. Carbon dioxide, is therefore, added in amount sufficient to form the silica hydrogel and convert completely or substantially completely the $Na_2O$ concentration of the sodium silica solution.

In the initial reaction of carbon dioxide with the sodium silicate solution, carbon dioxide is always added in amount sufficient to form the silica hydrogel. The point of gelation is dependent upon concentration of $SiO_2$ in the silicate solution, temperature and pH, for example. Under normal conditions, a silica hydrosol is first formed which, after a period of a few minutes, sets to a rather firm gel. Set time in the present invention is usually not more than about 10 minutes and generally is of the order of about ½ to 2 minutes. Agitation of the reaction mixture is continued during setting of the hydrosol and after the hydrosol has completely gelled to maintain the hydrogel in slurry form. In batch processes, the hydrogel is aged for about 30 to 45 minutes and the pH of the hydrogel after aging is about 9.5 to about 10.0. In a continuous process, aging can continue for about 60 to 70 minutes, and the pH of the initial hydrosol runs about the same as the pH of the aged hydrogel in the batch process.

In order to increase the alumina content of the final catalyst to between about 15% and 40%, it is necessary to introduce supplementary quantities of basic reagent into the process. It is a criterion of this invention to introduce such reagent into the aqueous slurry of silica hydrogel containing the dissolved carbonate resulting from the initial reaction shown in the above Equation 1 and before the introduction of any aluminum sulfate into the slurry. The basic reagent together with the dissolved carbonate present in the slurry increases the amount of available precipitating agent necessary to obtain the higher concentration of alumina in the catalyst. If the aluminum sulfate is added to the slurry of Equation 1 before said slurry is supplemented with additional quantities of basic reagent, a portion of the alumina will precipitate. In such case, during the interval between aluminum sulfate and basic reagent addition some of the freshly precipitated alumina and aluminum sulfate solution will react to form an insoluble basic aluminum sulfate. This renders sulfate removal difficult and does not yield a wholly satisfactory catalyst.

If, on the other hand, the basic reagent is added to the slurry of hydrogel and dissolved carbonate before addition of aluminum sulfate thereto, all of the alumina will precipitate at once and thus formation of basic aluminum sulfate is avoided. In addition, sulfate removal is facilitated. When a 25% alumina catalyst is prepared from a starting sodium silicate solution having a $SiO_2:Na_2O$ weight ratio of about 3.25:1, the pH of the system after all of the aluminum sulfate solution has been added should be between about 4.4 and 5.7. This pH range has an effect on the dispersion of the alumina within the silica gel carrier because in this range the alumina is precipitated in a finely divided form. Such dispersion favorably influences the steam catalytic activity of the catalyst.

Suitable supplementary basic reagents are gaseous ammonia, ammonium hydroxide, ammonium carbonate, sodium hydroxide, sodium carbonate or similar alkaline compounds. While the enumerated reagents will function satisfactorily as supplementary precipitants in precipitating the requisite amount of alumina, economic considerations favor the use of sodium carbonate. When ammonia or ammonium hydroxide is used as the supplementary precipitant, some ammonium carbonate is formed, thus decreasing the amount of $CO_2$ which can be recovered. Although ammonium carbonate can be used as a precipitating agent, its use would render the process less economical than the use of sodium carbonate. When ammonia is used in the process, it will thereafter appear as the sulfate impurity. On the other hand, when sodium carbonate is employed as the supplementary reagent, carbon dioxide is formed which can be recovered and reused in the initial step of the process. Moreover, since sodium carbonate is formed in the initial reaction of carbon dioxide and sodium silicate solution, the addition of the common sodum carbonate thereto will facilitate calculation of the amount of reagent necessary to precipitate the desired amount of alumina. Since, according to Equation 1, a silica-alumina catalyst containing about 14.5% alumina can be prepared from a sodium silicate solution having a $SiO_2:Na_2O$ weight ratio of about 3.25:1, it is a simple matter to calculate the amount of additional sodium carbonate necessary to increase the amount of alumina to any level. As stated above, one mol of sodium carbonate will precipitate one-third mol of alumina.

Following addition of the supplementary amount of basic reagent, the mixture of hydrogel, sodium carbonate and basic reagent is aged for a period of about 2 to 35 minutes and at a pH of about 9.5 to about 10.5. The addition of basic reagent to the hydrogel slurry causes a slight increase in the pH of the mixture. Where the basic reagent is sodium carbonate, aging permits even distribution of it in the slurry which in turn evenly distributes alumina throughout the catalyst.

To the slurry of silica hydrogel thus formed and supplemented with additional sodium carbonate as basic reagent, there is then added an aqueous solution of aluminum sulfate with agitation. Such solution is added in amount necessary to introduce the requisite alumina concentration in the final catalyst, care being exercised to avoid using excess of precipitating agent for the reasons aforesaid. The aluminum sulfate reacts with the sodium carbonate present in the hydrogel slurry thus precipitating alumina in one stop. Such precipitation facilitates sulfate removal in the subsequent purification steps since no insoluble basic aluminum sulfate is formed. Attendant with alumina precipitation there is a liberation of carbon dioxide which can be recovered and reused in the initial step of the process. So long as the pH of the resulting mixture is maintained between about 4.4 and 5.7, substantially all of the alumina will be precipitated and dispersed uniformly within the silica gel carrier It is desirable that the aluminum sulfate solution not contain substantial quantities of free acid. If it does, such acid tends to neutralize sodium carbonate thus, removing portions of the alkali necessary to precipitate all of the alumina from the aluminum sulfate solution. Since such solutions are prepared by dissolving alumina hydrate in sulfurice acid, the absence of excess acid is not always assured and occasionally the solution will contain about 1 to 2% free sulfuric acid. Under these circumstances, small amounts of free acid will not seriously affect the final product, the only disadvantage being that the theoretical quantity of alumina precipitatable by the sodium carbonate originally present will not be attained.

The period between aluminum sulfate addition and supplemental amounts of sodium carbonate to the hydrogel slurry should be of short duration. If the time between such additions is too long, the sodium carbonate tends to form a zeolitic compound which is difficult to remove during the washing stage.

The silica-alumina composite thus formed may be aged for a short period following which it is filtered and further processed according to conventional methods. The usual procedure followed after filtration is to dry, wash the composite free of soda and sulfate impurities and then redry. Filtration can be improved by increasing the pH of the silica-alumina slurry to the alkaline side, that is, to a pH value of about 8.0 by the addition thereto of ammonia. Such ammonia addition at this stage of the process does not affect the quality of the catalyst. If desired, the filtered material may be washed prior to drying and the washed material spray-dried to form silica-alumina microspheres. The order of washing and drying may, of course, be varied without departing from the spirit of the present invention.

The present invention thus provides a process for preparing silica-alumina hydrocarbon cracking catalysts having high alumina content. In carrying out the process, the general use of a mineral acid, particularly sulfuric acid, is totally eliminated. Moreover, alumina precipitation is partially effected by the base formed in preparing the hydrogel, with a further advantage that carbon dioxide can be reused in the process.

The invention is further illustrated by the following examples:

EXAMPLE I

Stoichiometric amounts of carbon dioxide gas and a 7° Bé sodium silicate solution containing 4.74% $SiO_2$ ($SiO_2:Na_2O$ weight ratio equal to 3.23:1) were mixed in a mixing nozzle and passed through a one-inch rubber hose to give a one minute retention time in the hose. Upon contact of the carbon dioxide with the silicate a silica hydrosol was formed having a pH of 9.6 and at a temperature of 75° F. The hydrosol was passed from the retention line to a tank where it was agitated with gelation taking place in 80 seconds. 120 gallons of silica gel slurry containing dissolved sodium carbonate were collected over a period of 24 minutes and the slurry was aged for 30 minutes. To the aged slurry there was then added with agitation a supplementary amount of 25% sodium carbonate solution containing 27 lbs. of $Na_2CO_3$. After all carbonate had been added the slurry exhibited a pH of 9.8. The slurry was again aged for 30 minutes.

To the aged slurry of silica hydrogel containing the sodium carbonate there was then added with agitation 210 lbs. of aluminum sulfate solution containing 7.29% $Al_2O_3$. Upon contact, carbon dioxide was liberated and alumina was precipitated in and on the silica hydrogel. The slurry containing the silica-alumina composite had a pH of 4.7. To facilitate subsequent filtration of the composite, ammonium hydroxide was added in amount sufficient to raise the pH thereof to 8.0, following which the slurry was filtered, washed and dried in a conventional manner to form the final catalyst.

EXAMPLE II

The same raw materials and procedures were followed as described in Example I in preparing the silica hydrosol. The resulting hydrosol had a pH of 9.6 at 73° F. with gelation occurring in 70 seconds. 60 gallons of hydrogel slurry were collected and aged for 40 minutes. A 25% solution of sodium carbonate containing 25 lbs. of $Na_2CO_3$ was added to the aged slurry resulting in an increase of the pH of the slurry to 9.9. This slurry was then aged for 30 minutes. Following such aging, 155 lbs. of aluminum sulfate solution containing 7.29% $Al_2O_3$ were added to form a silica-alumina composite having a pH of 5.1 which was then filtered and finished off in a conventional manner.

EXAMPLE III

Using the same reactants, the procedure of Example I in preparing the hydrosol was repeated. The resulting hydrosol, having a pH of 9.9 at 84° F., gelled in 40 seconds. Sixty gallons of the hydrogel were collected, slurried in water, and then aged for 42 minutes. To the aged hydrogel slurry, there was then added a 25% solution of sodium carbonate containing 35 lbs. of $Na_2CO_3$ which upon complete addition yielded a mixture having a pH of 10.3. This mixture was aged for 2 minutes and thereafter, 155 lbs. of aluminum sulfate solution containing 7.5% $Al_2O_3$ were added with thorough agitation, yielding a silica-alumina composite having a pH of 5.6. This composite was filtered and finished off by washing and drying.

EXAMPLE IV

This example illustrated preparation of a catalyst on a continuous basis. Stoichiometric amounts of carbon dioxide gas and 7° Bé sodium silicate solution containing 4.74% $SiO_2$ ($SiO_2:Na_2O$ weight ratio of 3.23:1) were contacted in a mixing nozzle and continuously passed through a retention line at a rate of 0.7 gallon per minute. The resulting silica hydrosol, having at pH of 9.9 at a temperature of 90° F., was deposited in a tank where it set to a hydrogel in 60 seconds. It was then agitated to form a slurry of hydrogel particles and as such it was aged for 70 minutes. The aged slurry was then pumped from the tank and delivered to a mixing nozzle where a 25% solution of sodium carbonate was admixed therewith. The carbonate solution was added in amount sufficient which together with the dissolved sodium carbonate present in the hydrogel slurry would subsequently precipitate approximately 25% $Al_2O_3$. This mixture was then passed to a second tank to which was added aluminum sulfate solution in sufficient quantity to incorporate about 25% $Al_2O_3$ in the final catalyst. The resulting silica-alumina composite had a pH of 5.7. It was then filtered, dried and purified.

Analysis of the silica-alumina catalysts prepared according to the process described in the foregoing Examples I to IV are set forth in the following table:

*Table II*

| Catalyst Prepared According to— | Wt. Percent $Al_2O_3$ | Wt. Percent $Na_2O$ | Wt. Percent $SO_4$ |
| --- | --- | --- | --- |
| Example I | 28.4 | 0.066 | 0.48 |
| Example II | 29.2 | 0.067 | 0.48 |
| Example III | 34.2 | 0.75 | 0.25 |
| Example IV | 24.7 | 0.13 | 0.77 |

From this table, it is readily apparent that silica-alumina catalysts having a high alumina content can be prepared according to the process of the present invention without encountering any operating difficulties. Moreover, sulfate and soda impurities are reduced to a satisfactory level without loss of any alumina during the washing treatment.

In order to determine the catalytic cracking activity and stability of a silica-alumina cracking catalyst, an accelerated test has been devised to simulate the conditions prevalent during the early period of catalyst use where the decrease of catalyst stability is most pronounced. This test involves compressing a sample of fresh catalyst into pellets and splitting the compressed pellets into two portions, one for thermal deactivation and one for steam deactivation. Thermal deactivation is carried out in two muffle furnaces; first at a temperature of 400° F. and then at 1550° F. The sample is moved from the low temperature to the higher temperature muffle, remaining in each for three hours. Steam deactivation is carried out first at atmospheric pressure and in the absence of steam by holding the catalyst for five hours at 400° F., and then for three hours at 1050° F., followed by treatment in an atmosphere of steam at 60 p.s.i.g. and 1050° F for 24 hours.

The activity of the four catalysts prepared according to Examples I to IV were tested as described above. In carrying out the activity tests, 200 ml. of deactivated catalyst were placed in a reactor and maintained at a temperature of 850° F. During a period of 2 hours, 238.2 ml. of virgin East Texas light gas oil was passed through the hot catalyst. The cracked products were recovered and separated. The fraction which distilled below 400° F., as well as gas and loss, was determined and designated as the distillate plus loss, or more simply, D+L. The results of these tests are as follows:

*Table II*

|  | Catalyst Prepared According to— | | | |
| --- | --- | --- | --- | --- |
|  | Example I | Example II | Example III | Example IV |
| Steamed Activity at 1,050° F.: | | | | |
| D + L | 39.9 | 39.4 | 37.2 | 37.9 |
| G. P. F | 0.94 | 1.03 | 1.08 | 1.11 |
| C. P. F | 1.02 | 1.00 | 1.05 | 1.14 |
| Thermal Activity at 1,550° F.: | | | | |
| D + L | 55.0 | 56.7 | 52.0 | 50.5 |
| G. P. F | 0.85 | 0.98 | 1.03 | 1.06 |
| C. P. F | 0.87 | 1.23 | 0.96 | 1.09 |

In Table II, G.P.F. and C.P.F. refer to "gas producing factor" and "carbon producing factor," respectively. The values assigned these factors are relative to the gas and carbon produced by a standard catalyst, which is taken as 1.00 in both cases. These factors are a measure of stability.

The silica-alumina material prepared according to the present invention may be spray-dried to form microspheres, or it may be dried to form granules, which may be used as such, or ground, or formed into pellets. The general method of cracking with the catalysts of this invention usually involves contacting heated hydrocarbon feedstock with the catalyst at substantially atmospheric pressure and temperatures of about 850°–950° F., and fractionating the cracked products. The conditions and the manner of carrying out the cracking process are generally well known in the art.

I claim:

1. A process for preparing silica-alumina catalysts containing amounts of alumina in excess of about 15% which comprises reacting an aqueous solution of an alkali metal silicate having a silica:alkali metal oxide weight ratio of about 3.25:1 with carbon dioxide in amount sufficient to substantially convert all of the alkali to alkali metal carbonate and form a slurry of silica hydrogel containing dissolved alkali metal carbonate, adding to said slurry a supplementary amount of a basic reagent which together with the residual alkali metal carbonate present in said slurry is sufficient to subsequently precipitate between about 15% and 40% by weight alumina, commingling therewith an aqueous solution of an aluminum salt whereby alumina is precipitated from said salt solution in and on said hydrogel and thereby form a silica-alumina composite, and washing and drying said composite.

2. A process according to claim 1 wherein the alkali metal silicate is sodium silicate.

3. A process according to claim 1 wherein the aluminum salt is aluminum sulfate.

4. A process according to claim 1 wherein the basic reagent is sodium carbonate.

5. A process for preparing silica-alumina catalysts containing amounts of alumina in excess of about 15% which comprises reacting an aqueous solution of sodium silicate having a silica: soda weight ratio of about 3.25:1 with carbon dioxide in amount sufficient to substantially convert all of the soda to sodium carbonate and form a slurry of silica hydrogel containing dissolved sodium carbonate, adding to said slurry with agitation a supplementary amount of sodium carbonate which together with the residual sodium carbonate present in said slurry is sufficient to subsequently precipitate between about 15% and 40% by weight alumina in the final catalyst, commingling therewith an aqueous solution of aluminum sulfate whereby alumina is precipitated in and on said hydrogel and thereby form a silica-alumina composite, and purifying and drying said composite.

6. A process for preparing a silica-alumina catalyst containing about 25% alumina and suitable for use in catalytically cracking hydrocarbons which comprises reacting an aqueous solution of sodium silicate having a silica-to-soda ratio of about 3.25:1 with sufficient carbon dioxide to convert substantially all of the soda to sodium carbonate and form a slurry of silica hydrogel containing dissolved sodium carbonate, adding to said slurry with agitation a supplementary amount of sodium carbonate which together with the residual sodium carbonate present in said slurry is sufficient to subsequently precipitate about 25% by weight alumina in the final catalyst, commingling therewith the requisite amount of an aqueous solution of aluminum sulfate whereby alumina is precipitated in and on said hydrogel and thereby form a silica-alumina composite, and purifying and drying said composite.

7. A process according to claim 6 wherein the system is at a pH between about 4.4 and 5.7 after all of the aluminum sulfate solution has been added.

8. In a process for preparing a silica-alumina hydrocarbon cracking catalyst wherein an aqueous solution of an alkali metal silicate having a silica:alkali metal oxide weight ratio of about 3.25:1 is reacted with carbon dioxide to form a slurry of a silica hydrogel containing dissolved alkali metal carbonate and an aqueous solution containing an aluminum salt of a strong mineral acid is commingled with said slurry whereby alumina is precipitated in and on said silica hydrogel to form a silica-alumina composite containing about 15–40% alumina and the resulting composite is washed and dried, the improvement comprising adding with agitation to the slurry containing the silica hydrogel and dissolved alkali metal carbonate a supplementary amount of basic reagent which together with the residual alkali metal carbonate present in the slurry is sufficient to subsequently precipitate about 15–40% alumina in the final silica-alumina composite.

9. A process according to claim 8 wherein the alkali metal silicate is sodium silicate.

10. A process according to claim 8 wherein the aluminum salt is aluminum sulfate.

11. A process according to claim 8 wherein the basic reagent is sodium carbonate.

12. In a process for preparing silica-alumina hydrocarbon cracking catalysts containing between about 15–40% alumina by weight, the steps which comprise providing a slurry of a silica hydrogel containing dissolved sodium carbonate, said hydrogel being prepared from an alkali metal silicate having a silica:alkali metal oxide weight ratio of about 3.25:1, adding to said slurry with agitation a supplementary amount of sodium carbonate which together with the residual sodium carbonate present in said slurry is sufficient to subsequently precipitate between about 15% and 40% by weight alumina in the final catalyst, commingling with the resulting slurry an aqueous solution of aluminum sulfate whereby alumina in the requisite amount is precipitated in and on said hydrogel and thereby form a silica-alumina composite, and washing and drying said composite.

13. A process for cracking hydrocarbon oils which comprises passing the oil under cracking conditions through a cracking zone containing a silica-alumina catalyst having about 15–40% alumina prepared by reacting an aqueous alkali metal silicate solution having a silica:alkali metal oxide weight ratio of about 3.25:1 with carbon dioxide to form a slurry of silica hydrogel containing dissolved alkali metal carbonate, adding to said slurry with agitation a supplementary amount of basic reagent which together with the residual alkali metal carbonate present in said slurry is sufficient to subsequently percipitate about 15–40% alumina in the final catalyst, commingling therewith the requisite amount of an aqueous solution of an aluminum salt of a strong mineral acid whereby alumina is precipitated from said salt solution in and on said hydrogel and thereby form a silica-alumina composite, and purifying and drying said composite.

References Cited in the file of this patent

UNITED STATES PATENTS

| | | |
|---|---|---|
| 2,174,177 | Kraybill et al. | Sept. 26, 1939 |
| 2,386,337 | Moyer | Oct. 9, 1945 |
| 2,886,512 | Winyall | May 12, 1959 |